United States Patent
Quintana et al.

[15] 3,668,226
[45] June 6, 1972

[54] STRAIGHT CHAIN ALIPHATIC CARBOXYLIC ACID MONOESTERS OF 1,3-DIHYDROXY-2-PROPANONE

[72] Inventors: Ronald P. Quintana; Lorrin R. Garson; Andrew Lasslo, all of Memphis, Tenn.

[73] Assignee: The United States of America as represented by the Secretary of the Army

[22] Filed: Feb. 26, 1970

[21] Appl. No.: 14,417

[52] U.S. Cl. .................260/410.6, 260/488 J, 260/340.6, 424/311, 424/312
[51] Int. Cl. .................................C07c 69/28, A01n 9/24
[58] Field of Search......................260/410.6, 488 J

[56] References Cited

UNITED STATES PATENTS 2,627,489    2/1953    Drake et al. .............................424/27

OTHER PUBLICATIONS

Tiffany et al., J. Am. Chem. Soc. 79, pp. 1682– 1683 (1957)

*Primary Examiner*—Lewis Gotts
*Assistant Examiner*—Diana G. Rivers
*Attorney*—Charles K. Wright, Jr., William G. Gapcynski and Lawrence A. Neureither

[57] ABSTRACT

This invention relates to perdurable insect repellent compositions comprising a precursor molecule which includes a moiety with dermal anchoring properties linked to a moiety with insect repellent properties. There are also described six new compounds, illustrative of the perdurable insect repellent structure. The six compounds are monoesters of 1,3-dihydroxy-2-propanone and the straight-chain aliphatic carboxylic acids—propanoic acid, pentanoic acid, hexanoic acid, heptanoic acid, octanoic acid, and undecanoic acid.

1 Claim, 2 Drawing Figures

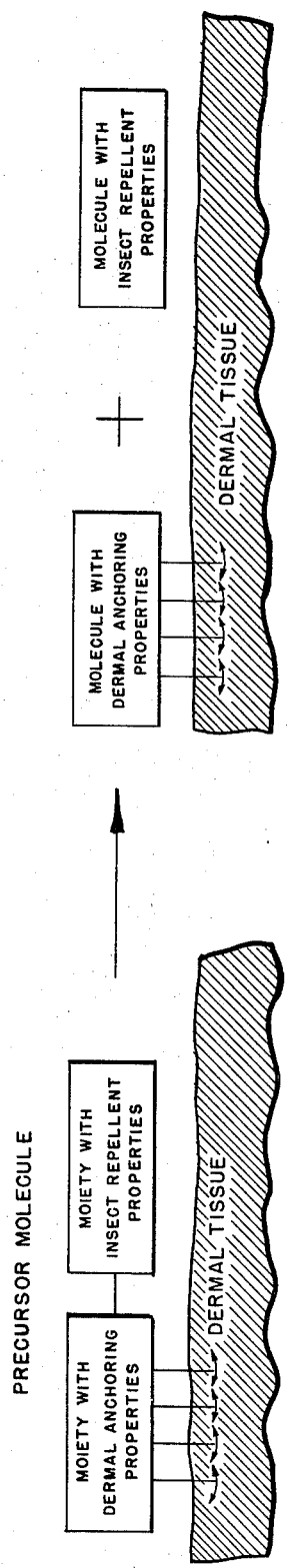

3,668,226

STRAIGHT CHAIN ALIPHATIC CARBOXYLIC ACID MONOESTERS OF 1,3-DIHYDROXY-2-PROPANONE

The invention herein described was made in the course of or under a contract or subcontract thereunder with the Department of the Army.

BACKGROUND OF THE INVENTION

1. Field of the Invention

This invention relates to the field of perdurable or long-lasting insect repellents. More specifically, it relates to perdurable insect repellent compositions comprising a precursor molecule which includes a moiety with dermal anchoring properties linked to a moiety with insect repellent properties.

2. Description of the Prior Art

The prior art includes many insect repellents of varying degrees of activity and of varying degrees of perdurability. During World War II and thereafter, the Orlando, Florida laboratory of the U.S. Department of Agriculture Bureau of Entomology evacuated thousands of compounds as insecticides and repellents. U.S. Department of Agriculture Handbook No. 69, (May 1954) *Chemicals Evaluated as Insecticides and Repellents at Orlando, Fla.*, compiled by W. V. King (hereafter cited as "King"), reports results for about 11,000 compounds. The magnitude of the evaluation program indicates the importance of insect repellents. Among the compounds reported in King are the following carboxylic acids which are related to the six compounds synthesized as examples of the present invention:

| Carboxylic Acid | Page No. (in King) | Insect Repellency in Skin Applications (Protection Time) |
|---|---|---|
| Propanoic acid (propionic acid) | 285 | No data |
| Pentanoic acid (valeric acid) | 335 | No data |
| Hexanoic acid (caproic acid) | 102 | No data |
| Heptanoic acid (ethanthic acid) | 157 | 121–180 minutes against yellow fever mosquitoes; 90–150 minutes against malaria mosquitoes |
| Octanoic acid (caprylic acid) | 105 | No data |
| Undecanoic acid (hendecanoic acid) | 185 | 300 or more minutes against yellow fever mosquitoes; 90–150 minutes against malaria mosquitoes |

Another example of prior art in the field of insect repellents is N. Drake et al., U.S. Pat. No. 2,627,489, issued Feb. 3, 1953, which teaches that monoesters of a lower aliphatic carboxylic acid and a saturated diol are active insect repellents. It is interesting to note in the Drake et al. patent that 1,3-cyclohexanediol monobutyrate, the compound with the longest-lasting insect repellency in skin applications, lasted only 267 minutes (4 hours and 27 minutes). Hence, the protection times reported in King, supra, and in the Drake et al. patent give some indication of the primary shortcoming of the prior art — lack of perdurability of the insect repellent. This problem (lack of perdurability) is solved by the present invention.

SUMMARY OF THE INVENTION

This invention provides perdurable insect repellent compositions comprising a precursor molecule including a moiety with dermal anchoring properties linked to a moiety with insect repellent properties. This invention also provides a method of producing long-lasting insect repellency on dermal tissue by applying to the skin a precursor molecule including a moiety with dermal anchoring properties linked to a moiety with insect repellent properties, and allowing the precursor molecule to react with agents found on dermal tissue whereby the moiety with insect repellent properties is gradually released from the moiety with dermal anchoring properties.

Specific compounds synthesized as examples of the present invention have shown remarkably long-lasting insect repellent properties. The specific compounds synthesized are monoesters of 1,3-dihydroxy-2-propanone (also known as dihydroxyacetone) and the straight chain aliphatic carboxylic acids — propanoic acid, pentanoic acid, hexanoic acid, heptanoic acid, octanoic acid, and undecanoic acid.

Accordingly, it is an object of this invention to provide perdurable insect repellents.

Another object of this invention is to provide perdurable insect repellent compositions comprising a precursor molecule including a moiety with dermal anchoring properties linked to a moiety with insect repellent properties.

Finally, it is an object of this invention to provide a method of producing long-lasting insect repellency on dermal tissue by applying a precursor molecule including a moiety with dermal anchoring properties linked to a moiety with insect repellent properties, and allowing the precursor molecule to react with agents found in and on dermal tissue whereby the moiety with insect repellent properties is gradually released from the moiety with dermal anchoring properties.

BRIEF DESCRIPTION OF THE DRAWINGS

FIG. 1 shows schematically a precursor molecule anchored to dermal tissue. The precursor molecule includes a moiety with dermal anchoring properties linked to a moiety with insect repellent properties.

FIG. 2 shows schematically the situation of FIG. 1 after release of the moiety (now seen as an independent molecule) with insect repellent properties. The moiety with dermal anchoring properties (now seen as an independent molecule) remains anchored to dermal tissue.

DESCRIPTION OF THE PREFERRED EMBODIMENTS

This invention provides perdurable insect repellents. We have solved the problem of lack of perdurability seen in the prior art. We recognized that lack of perdurability was a result of the fact that the prior art insect repellent compounds had a lack of affinity for dermal tissue. Hence, we provide long-lasting insect repellent efficacy by means of a precursor molecule which has affinity for dermal tissue. The precursor molecule is anchored to the epidermal surface. FIG. 1 illustrates this concept schematically. FIG. 1 shows a precursor molecule including a moiety or component with dermal anchoring properties chemically linked to a moiety or component with insect repellent properties. The moiety with dermal anchoring properties interacts with the skin to hold the precursor molecule on the dermal tissue. This anchoring effect is shown in FIG. 1 by the symbolized "anchors" descending into the dermal tissue from the moiety with dermal anchoring properties.

FIG. 2 schematically depicts how this invention provides long-lasting insect repellent efficacy by means of a gradual release of the moiety with insect repellent properties from the precursor molecule anchored to the dermal tissue. The precursor molecule (seen in FIG. 1) gradually releases the moiety with insect repellent properties and this moiety of the precursor molecule becomes the molecule with insect repellent properties seen in FIG. 2. The moiety with dermal anchoring properties in FIG. 1 becomes the molecule with dermal anchoring properties seen in FIG. 2. The arrow symbol shown between FIG. 1 and FIG. 2 represents the gradual release from the precursor molecule of the moiety with insect repellent properties. It is believed that the gradual release of the moiety with insect repellent properties is caused by certain agents found on and in the epidermal structure. Thus, release may be effected by moisture, pH factors, enzymes, and bacterial flora on and in the dermal tissue structure. In the case of precursor molecules which are esters, esterases or other enzymes may be the principal causative agent initiating the release.

As an example of this invention, six novel compounds have been synthesized. The compounds are monoesters of 1,3-dihydroxy-2-propanone (also known as dihydroxyacetone). The ability of 1,3-dihydroxy-2-propanone, and of some structurally related entities, to interact with skin is well established. See E. Wittgenstein et al., *J. Invest. Dermatol.*, 36: 283 (1961) E. Wittgenstein et al., *Science*, 132: (1960); L. Goldman et al., *J. Invest.,Dermatol.*, 35:161 (1960); and H. Maibach et al., *Arch. Derm.*, 82: 505 (1960). Hence, 1,3-dihydroxy-2-propanone is an example of a compound which may serve as the moiety with dermal anchoring properties in the precursor molecule.

The King report discussed above in "Description of the Prior Art" indicates that some of the lower aliphatic carboxylic acids are insect repellents. Hence, the moiety with insect repellent properties may be, for example, a lower aliphatic carboxylic acid. The examples that follow show the precursor molecules which result when 1,3-dihydroxy-2-propanone is used to provide the moiety with dermal anchoring properties and when a lower aliphatic carboxylic acid is used to provide the moiety with insect repellent properties.

The examples presented below are not exhaustive of the present invention. Each of the compounds synthesized is a perdurable insect repellent composition comprising a precursor molecule including a moiety with dermal anchoring properties linked to a moiety with insect repellent properties. Therefore, the following compounds are presented as illustrations of the invention:

EXAMPLE 1
Preparation of 1-propanoyloxy-3-hydroxyacetone (also called dihydroxyacetone monopropionate)

Four lots of the compound were synthesized as follows: To a 2-l., three-neck flask fitted with an alcohol thermometer, a mechanical stirrer, a 250-ml. pressure-compensated addition funnel, and a Friedrich's condenser fitted with a Drierite tube, was added 100.0 gm. (1.110 moles) of 1,3-dihydroxy-2-propanone and 555 ml. of dry pyridine (freshly distilled from KOH).

Propionyl chloride (25.7 gm., 0.278 mole) was dissolved in 555 ml. of dry chloroform (freshly distilled from $P_2O_5$), and this solution was added dropwise over a period of 2.5 to 3.0 hrs. while maintaining a temperature of −6° to −2° C. After the addition was complete, the reaction mixture was allowed to warm to 25° C. and then allowed to stir for one hour at this temperature. 10 ml. of water was then added to stop the reaction. To a 5-l., three-neck flask fitted with a mechanical stirrer, an alcohol thermometer, and two 125 ml. pressure-compensated addition funnels, was added 500 ml. of 3N HCl and 1 kilogram of ice. This mixture was cooled to −7° C. Then one liter of 6N HCl, and the pyridine-chloroform reaction mixture were added slowly, at the same rate, over a period of 1.7 hours, while maintaining a temperature of −5° C. to −1° C. At the end of the addition, the mixture was distinctly acidic. The chloroform phase was separated off, and the aqueous phase divided into three portions (one liter each). Each portion was extracted with 4×200 ml. of chloroform, and the chloroform extracts were combined. The chloroform solution (3,000 ml.) was divided into three portions, and each was washed with one 100 ml. portion and one 50 ml. portion of water. The chloroform phase was filtered and dried overnight over anhydrous sodium sulfate. The chloroform solution was then obtained by filtration, the drying agent being rinsed with more chloroform, and the chloroform solvent then removed by distillation in vacuo. The residual oily liquid was treated with 800 ml. of benzene, this being removed by distillation in vacuo.

The four batches of oily liquid crude product (61.3 gm., 37.7 percent) were combined and dried in vacuo at room temperature. The residual oily liquid was then distilled in vacuo. The fraction boiling at 80°–82° C./0.10–0.12 mm. weighed 34.4 gm. (21.2 percent yield) and was a clear oily liquid which tended to crystallize on standing but which would liquefy when warmed.

An elemental analysis gave the following results: Anal. Calcd. for $C_6H_{10}O_4$: C, 49.31; H, 6.90. Found: (analysis No. 1) — C, 49.60, 49.52; H, 7.03, 6.92. (analysis No. 2) — C, 49.52, 49.60; H, 6.97, 7.00.

EXAMPLE 2
Preparation of 1-pentanoyloxy-3-hydroxyacetone (also called dihydroxyacetone monopentanoate)

To a 2-l., three-neck flask fitted with an alcohol thermometer, a mechanical stirrer, and a 250-ml. pressure-compensated addition funnel, was added 99.3 gm. (1.102 moles) of dihydroxyacetone and 555 ml. of dry pyridine. Valeryl chloride (33.5 gm., 0.278 mole) was dissolved in 555 ml. of dry chloroform (freshly distilled from $P_2O_5$) and this solution was added dropwise to the above solution over a period of 1.5 hrs. while maintaining a temperature of −8° to −5° C. After the addition was complete, the reaction mixture was allowed to warm to 25° C. and was then stirred for 1 hour. 10 ml. of water was added to stop the reaction.

To a 5-l., three-neck flask fitted with a mechanical stirrer, an alcohol thermometer, and two 125-ml. pressure-compensated additional funnels was added 500 ml. of 3N HCl and one kilogram of ice. The mixture was cooled to −10° C., then one liter of 6N HCl and the pyridine-chloroform reaction mixture were added slowly, at the same rate, over a period of two hours while maintaining a temperature of −8° to −3° C. The chloroform phase was removed and the aqueous phase was divided into two portions. Each portion was extracted with 4×150 ml. of chloroform, and the chloroform extracts were combined with the original chloroform phase and dried over anhydrous magnesium sulfate. The chloroform solution was then filtered, the drying agent being rinsed with more chloroform, and the chloroform solvent removed by distillation in vacuo. The residual oily liquid product was dried in vacuo for 18 hours.

The oily liquid was distilled in vacuo through a 1 foot Vigreaux column with a reflux head. The fraction boiling at 106°–110° C./0.15 mm. Hg (uncorr.) weighed 21.5 gm. (44.4 percent yield) and was a clear, oily liquid; $n_D^{25}$ 1.4517, $d^{25}$ 1.117.

An elemental analysis gave these results: Anal. Calcd. for $C_8H_{14}O_4$(M.W. 174.200): C, 55.16, H, 8.10; O, 36.74. Found: C, 55.50, 55.42; H, 8, 12, 8.07.

EXAMPLE 3
Preparation of 1-hexanoyloxy-3-hydroxyacetone (also called dihydroxyacetone monohexanoate)

Two lots of the compound were synthesized as follows:

To a 2-l., three-neck flask fitted with an alcohol thermometer, a mechanical stirrer, a 250-ml. pressure-compensated addition funnel fitted with a Drierite tube, and a Friedrich's condenser also fitted with a Drierite tube, was added 100.0 gm. (1.110 moles) of dihydroxyacetone and 555 ml. of dry pyridine. Hexanoyl chloride (37.4 gm., 0.278 mole) was dissolved in 555 ml. of dry chloroform (freshly distilled from $P_2O_5$), and this solution was added dropwise over a period of 2.5 hrs. while maintaining a temperature of −6° to −2° C. After the addition was complete, the reaction mixture was allowed to warm to 25° C. and then allowed to stir for 1 hour at this temperature. 10 ml. of water was then added to stop the reaction.

To a 5-l., three-neck flask fitted with a mechanical stirrer, an alcohol thermometer, and two 125-ml. pressure-compensated addition funnels was added 500 ml. of 3N HCl and 1 kilogram of ice. This mixture was cooled to −10° C. Then 1 liter of 6N HCl and the pyridine-chloroform reaction mixture were added slowly, at the same rate, over a period of 2 hours while maintaining a temperature of −5° to −2° C. At the end of the addition, the mixture was distinctly acidic.

The chloroform phase was separated off, and the aqueous phase was divided into three portions (one liter each). Each portion was extracted with 2×200 ml. of chloroform, and the chloroform extracts were combined. The chloroform solution (1,700 ml.) was divided into two portions, and each was washed with one 100-ml. portion and one 50-ml. portion of water. The chloroform phase was filtered and dried overnight over anhydrous sodium sulfate. The chloroform solution was then obtained by filtration, the drying agent being rinsed with more chloroform, and the chloroform solvent removed by distillation in vacuo. The residual oily liquid was treated with 800 ml. of benzene, this being removed by distillation in vacuo.

After drying in vacuo at room temperature for 2 hours, the two batches of oily liquid crude product (103.6 gm.) were combined, and dissolved in 95 percent ethanol (250 ml.). The ethanol was removed by distillation in vacuo and the residual oily liquid azeotroped with 2×300 ml. of benzene. The residual oily liquid (95.4 gm.) was then distilled in vacuo. The fraction boiling at 114°–116° C./0.25 mm. weighed 54.3 gm. (52.0 percent yield) and this was the desired end product.

An elemental analysis gave these results: Anal. Calcd. for $C_9H_{16}O_4$ (M.W. 188.277): C, 57.43; H, 8.57. Found: C, 57.36, 57.57; H, 8.45, 8.43.

EXAMPLE 4

Preparation of 1-heptanoyloxy-3-hydroxyacetone (also called dihydroxyacetone monoheptanoate)

To a 2-1., three-neck flask fitted with an alcohol thermometer, a mechanical stirrer, and a 250-ml. pressure-compensated addition funnel, was added 100.0 gm. (1.110 moles) of dihydroxyacetone and 555 ml. of dry pyridine. Heptanoyl chloride (41.3 gm., 0.278 mole) was dissolved in dry chloroform (freshly distilled from $P_2O_5$) and added dropwise to the above solution over a period of 2-1/6 hrs. while maintaining a temperature of −11° C. to −2° C. When addition was complete, the reaction mixture was allowed to warm to 20° C. and was then stirred for 1 hour.

To a 5-1., three-neck flask fitted with an alcohol thermometer, a mechanical stirrer, and two 125-ml. pressure-compensated addition funnels, was added 500 ml. of 3N HCl and 1 kilogram of ice. The mixture was cooled to −11° C. and 1 liter of 6N HCl and the pyridine-chloroform reaction mixture were added dropwise, at the same rate, over a period of 2 hours while maintaining a temperature of −11° to −3° C. The chloroform phase was separated and the aqueous phase was divided into two portions. Each portion was washed with 3×150 ml. of chloroform, and the chloroform extracts were combined with the chloroform phase and dried overnight over anhydrous magnesium sulfate. The chloroform solution was filtered, the drying agent being rinsed with additional chloroform, and the solvent was removed by distillation in vacuo. The residual oily liquid was dissolved in benzene, and the benzene was then removed by distillation in vacuo. The residual oily liquid was dried in vacuo for 1-½ hrs. at room temperature. The oily liquid was distilled in vacuo using a micro-claisen head with micro-water condenser and "cow." The fraction boiling at 108°–111° C./0.25 mm. Hg was the desired end product 1-heptanoyloxy-3-hydroxyacetone. The product weighed 12.8 gm. (22.8 percent yield) and was a clear, oily liquid.

An elemental analysis gave these results: Anal. Calcd. for $C_{10}H_{18}O_4$ (M.W. 202.254): C, 59.39; H, 8.97, O, 31.64. Found: C, 59.52, 59.60; H, 8.94, 9.09.

EXAMPLE 5

Preparation of 1-octanoyloxy-3-hydroxyacetone (also called dihydroxyacetone monooctanoate)

To a 2-1., three-neck flask fitted with an alcohol thermometer, a mechanical stirrer, and a 250-ml. pressure-compensated addition funnel was added 98.3 gm. (1.091 moles) of dihydroxyacetone and 555 ml. of dry pyridine. Octanoyl chloride (44.4 gm., 0.273 mole) was dissolved in dry chloroform (freshly distilled from $P_2O_5$) and was added dropwise to the above solution over a period of 2 hours while maintaining a temperature of −8° C. to −5° C. After addition was complete, the reaction mixture was allowed to warm to 20° C. and to stir for one hour.

To a 5-1., three-neck flask fitted with an alcoholic thermometer, a mechanical stirrer, and two 125-ml. pressure-compensated addition funnels was added 500 ml. of 3N HCl and one kilogram of ice. The mixture was cooled to −11° C. and one liter of 6N HCl and the pyridine-chloroform reaction mixture were added dropwise, at the same rate, over a period of 2-¼ hours while maintaining a temperature of −10° to 4° C. The chloroform phase was separated and the aqueous phase divided into two portions. Each portion was washed with 3×150 ml. of chloroform, and the extracts and chloroform phase were combined and dried overnight over anhydrous magnesium sulfate. The chloroform solution was filtered, the drying agent being rinsed with additional chloroform, and the solvent was removed by distillation in vacuo. The residual oily liquid was dissolved in benzene, and the benzene was then removed by distillation in vacuo. The residual liquid was dried 1-½ hours in vacuo at room temperature. The oily liquid was distilled in vacuo using a micro-claisen head with a micro-water condenser and "cow." The fraction boiling at 112°–126° C./0.31 mm. Hg (uncorr.) was the desired end product 1-octanoyloxy-3-hydroxyacetone. The product weighed 5.8 gm. (9.8 percent yield) and was a light yellow, oily liquid which solidified upon standing.

An elemental analysis gave the following results: Anal. Calcd. for $C_{11}H_{20}O_4$ (M.W. 216.281): C, 61.09, H, 9.32; O, 29.59. Found: (analysis No. 1) — C, 61.61; H, 9.50. (analysis No. 2) — C, 61.59; H, 9.58.

EXAMPLE 6

Preparation of 1-undecanoyloxy-3-hydroxyacetone (also called dihydroxyacetone monoundecanoate)

A solution of undecanoyl chloride (56.8 gm., 0.227 mole) in 555 ml. of chloroform (freshly distilled from $P_2O_5$) was added dropwise, over a period of 2 hours, to a stirred solution of 100 gm. (1.110 moles) of dry dihydroxyacetone in 555 ml. of dry, freshly distilled pyridine. The temperature of the reaction mixture was maintained at −2° to −6° C. After stirring an additional 1.2 hrs. while warming to 18° C., the pyridine-chloroform solution was slowly added to 500 ml. of cold (−10° C.) 3N HCl and 1,000 gm. of ice; during the addition, one liter of 6N HCl was simultaneously added. The aqueous phase was extracted three times with 400 ml. of chloroform and the combined chloroform phases were dried over anhydrous $Na_2SO_4$. Removal of the solvent in vacuo afforded 78 gm. of oily crude product. This was dissolved in 95 percent ethanol, and upon standing, a total of 12.5 gm. of crystalline material was collected. (This crystalline substance consisted primarily of the diester, 1,3-diundecanoyloxyacetone). The ethanol was removed by distillation in vacuo, the oily residue was treated three times with 70 ml. of benzene and the solvent was removed in vacuo after each addition.

The residue was dissolved in hexane and, upon standing, a crystalline product (23.6 gm., melting point 91.3°–93.3° C.) was collected; a second crop (14.0 gm., melting point 60.3°–83.2° C.) was also obtained. Recrystallization of the first crop from chloroform yielded the dimer, 2,5-diundecanoyloxymethyl-2,5-dihydroxy-1,4-dioxane, which has the following structure:

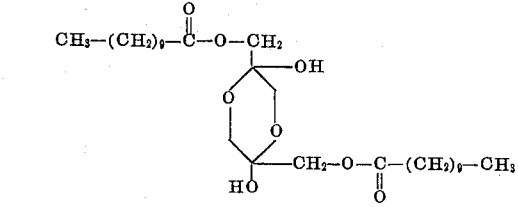

The dimer has a melting point of 96.8°–98.3° C.; $\lambda_{max}$ (p-dioxane)224 μ (ε74.5); $\gamma_{max}$ (chloroform) 3571, 3425 (O-H stretching), 1736 cm$^{-1}$ (ester carbonyl).

An elemental analysis of the dimer gave these results: Anal. Calcd. for $C_{28}H_{52}O_8$: C, 65.09; H, 10.14. Found: C, 65.25; H, 10.27.

After refluxing the dimer in 95 percent ethanol for 2 hours and after recrystallizing twice from the same solvent, the monomer (1-undecanoyloxy-3-hydroxyacetone) was obtained. The monomer had a melting point of 44.8°–46.1° C.; $\lambda_{max}$ (p-dioxane) 224 μ ( ε 39.7); 274.5 μ ( ε 19.8); $\gamma_{max}$ (chloroform) 3509 (O-H stretching), 1736 cm$^{-1}$ (ester and ketone carbonyl).

An elemental analysis of the monomer gave these results. Anal. Calcd. for $C_{14}H_{26}O_4$: C, 65.09; H, 10.14. Found: C, 65.18; H, 10.27.

EVALUATION OF INSECT-REPELLENT ACTIVITY AND DURABILITY

Test Design

Female *Aedes aegypti* mosquitoes, 7 to 8 days old, were confined in small cylindrical cages (4×12 cm). The sides of the cages were clear plastic; one end was covered with gauze and the other end was fitted with a plastic slide closure. Mosquitoes in stock cages were immobilized by exposure to a low temperature, and six females were placed in each small cage. The cages were then held in a warm room for at least 1 hour to permit the mosquitoes to recover before tests were begun. Three squares, each 2.5 cm², were outlined on the skin of each forearm of three subjects, and each square was treated with 20 mg/cm² of the evaluant compound in an inert carrier of solvent, such as ethanol. The latter was applied as an ethanol solution heated on a steam bath for 30 minutes prior to application to assure conversion to the monomeric state. Tests were made by placing the end of the cage equipped with the slide in contact with a treated area on a human arm, and by opening the slide to give the mosquitoes direct access to the treated skin for a period of 1 minute. In each test period cages of mosquitoes were exposed to untreated areas of the skin to provide checks on the percentage biting. Three tests on each of three subjects were employed in determining average values. The treated subjects remained during the eight hour workday in a room maintained at 82° F. and 78–80 percent relative humidity.

The results of the insect repellency evaluation are shown in the following table.

period) tends to coincide with the point following a period of limited exertion and limited perspiration, while that at 26 hours appears to coincide with a 4 hour active period following the overnight hours. Thus, the results may be interpreted in terms of enhanced hydrolytic release of the insect repellent moiety or component prior to the 4, 8, and 26 hour testing points. The level of insect repellency of Examples 3, 4, 5, and 6 is remarkably high at the later test intervals.

In addition to the tests summarized in the preceding table, 1-hexanoyloxy-3-hydroxyacetone (Example 3) was subsequently evaluated at additional time intervals; the treated subjects remained in a warm, humid room for a three hour period immediately prior to the evaluation. Under these conditions, 1-hexanoyloxy-3-hydroxyacetone provided essentially complete protection sixteen and twenty hours after application to the skin (biting at 16 hours 1.9 percent (control 64 percent, $LSD_{0.05}$ 10.8); biting at 20 hours 9.7 percent (control 64 percent, $LSD_{0.05}$ 10.8).

The repellent efficacy of 1-propanoyloxy-3-hydroxyacetone (Example 1) is also apparent; the compound provided almost complete protection 4 and 8 hours after application. The fact that it exerted no repellency at the subsequent test intervals can be interpreted in terms of a comparatively increased rate of hydrolysis normally associated with propanoic acid esters with respect to those of substantially larger aliphatic acids. The relatively higher volatility of the released propanoic acid with respect to the larger homologs could be also a contributing factor.

The specific contributions of the precursor molecules' intrinsic repellency and of that of the released acid-components

INSECT REPELLENCY EVALUATION

| Compound | Example number | LSD [2] | Percent biting at the hours indicated [3] | | | | | | | | | |
|---|---|---|---|---|---|---|---|---|---|---|---|---|
| | | | 4 | 8 | 12 | 16 | 20 | 22 | 24 | 26 | 28 | 30 |
| $CH_3-CH_2-\overset{O}{\underset{\|}{C}}-O-CH_2-\overset{O}{\underset{\|}{C}}-CH_2OH$ (Control) | 1 | 11.6 (11.6) | 5.5 (62.9) | 2.8 (62.9) | | | | 73.4 (75.1) | | 81.6 (75.1) | | 77.3 (62.9) |
| $CH_3-(CH_2)_3-\overset{O}{\underset{\|}{C}}-O-CH_2-\overset{O}{\underset{\|}{C}}-CH_2OH$ (Control) | 2 | 6.44 (6.44) | | 1.9 (77.3) | 8.4 (43.8) | 14.9 (43.8) | 35.3 (66.6) | | 42.7 (66.6) | | 53.9 (62.9) | |
| $CH_3-(CH_2)_4-\overset{O}{\underset{\|}{C}}-O-CH_2-\overset{O}{\underset{\|}{C}}-CH_2OH$ (Control) | 3 | 9.4 (9.4) | 4 0 (79.7) | 0 (68.4) | | | | 61.2 (57.4) | | 8.2 (57.4) | | 53.8 (76.8) |
| $CH_3-(CH_2)_5-\overset{O}{\underset{\|}{C}}-O-CH_2-\overset{O}{\underset{\|}{C}}-CH_2OH$ (Control) | 4 | 6.44 (6.44) | | 9.2 (56.0) | 7.4 (29.7) | 5.7 (29.7) | 15.2 (40.8) | | 16.8 (40.8) | | 16.7 (55.6) | |
| $CH_3-(CH_2)_6-\overset{O}{\underset{\|}{C}}-O-CH_2-\overset{O}{\underset{\|}{C}}-CH_2OH$ (Control) | 5 | 6.44 (6.44) | | | 0 (25.8) | 3.8 (25.8) | 16.7 (59.6) | | | | | |
| $CH_3-(CH_2)_9-\overset{O}{\underset{\|}{C}}-O-CH_2-\overset{O}{\underset{\|}{C}}-CH_2OH$ (Control) | 6 | 14.4 (14.4) | 24.2 (69.7) | 22.2 (59.2) | | | | 52.4 (40.8) | | 13.1 (40.8) | | 28.3 (59.2) |
| N,N-diethyl-meta-toluamide [5] (Control) | | | 12.1 (12.1) | | 0 (69.5) | 13.0 (25.8) | 0 (25.8) | 12.9 (59.6) | | | 55.7 (68.7) | | |

[1] Application rate 20 mg./cm.² applied in ethanol solution.
[2] Least significant difference at the 0.05 level.
[3] Average of three tests on each of three subjects with six mosquitoes per test. Leaders indicate that no measurement was performed at that hour.
[4] In addition, one subject received no bites when exposed to a stock cage (containing 1,000–1,500 mosquitoes) for three minutes.
[5] This compound is a standard insect repellent; application rate: 3 mg./cm.².

The preceding table shows the perdurability of the compounds synthesized as examples of the present invention. 1-Hexanoyloxy-3-hydroxyacetone (Example 3) completely prevented biting at the 4 and 8 hour test intervals and effected a dramatic reduction in biting at the 26 hour test interval compared to the corresponding standard insect repellent (N, N-diethyl-m-toluamide). It is of interest to note the similarity in effects produced by 1-undecanoyloxy-3-hydroxyacetone (Example 6) and 1-hexanoyloxy-3-hydroxyacetone (Example 3) at the 22 and 26 hour intervals; in both cases there is a resurgence of repellent effects from the 22 hour test to that at 26 hours. The test 22 hours after application (after the overnight have not been ascertained. It is apparent, however, that hydrolytic release of the latter is associated with maximum protection.

We Claim:

1. A compound having the formula

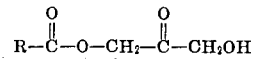

wherein R is selected from the group consisting of ethyl, butyl, pentyl, hexyl, heptyl, and decyl.

* * * * *